(12) United States Patent
Yi et al.

(10) Patent No.: US 11,591,677 B2
(45) Date of Patent: Feb. 28, 2023

(54) HIGH-STRENGTH STRUCTURAL STEEL MATERIAL HAVING EXCELLENT FATIGUE CRACK PROPAGATION INHIBITORY CHARACTERISTICS AND MANUFACTURING METHOD THEREFOR

(71) Applicant: POSCO, Pohang-si (KR)

(72) Inventors: Il-Cheol Yi, Gwangyang-si (KR); Jae-Young Cho, Gwangyang-si (KR); Sang-Deok Kang, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 232 days.

(21) Appl. No.: 16/957,332

(22) PCT Filed: Nov. 23, 2018

(86) PCT No.: PCT/KR2018/014523
§ 371 (c)(1),
(2) Date: Jun. 23, 2020

(87) PCT Pub. No.: WO2019/132262
PCT Pub. Date: Jul. 4, 2019

(65) Prior Publication Data
US 2020/0332399 A1    Oct. 22, 2020

(30) Foreign Application Priority Data
Dec. 26, 2017   (KR) .................. 10-2017-0179246

(51) Int. Cl.
*C22C 38/04*     (2006.01)
*C22C 38/00*     (2006.01)
(Continued)

(52) U.S. Cl.
CPC ............ *C22C 38/04* (2013.01); *C21D 8/0205* (2013.01); *C21D 8/0226* (2013.01);
(Continued)

(58) Field of Classification Search
None
See application file for complete search history.

(56) References Cited

U.S. PATENT DOCUMENTS

| 5,421,920 A | 6/1995 | Yamamoto et al. |
| 6,090,226 A | 7/2000 | Hasegawa et al. |
| (Continued) | | |

FOREIGN PATENT DOCUMENTS

| CN | 103108971 A | 5/2013 |
| CN | 105452513 A | 3/2016 |
| (Continued) | | |

OTHER PUBLICATIONS

Japanese Office Action dated Sep. 28, 2021 issued in Japanese Patent Application No. 2020-535189.
(Continued)

*Primary Examiner* — Anthony M Liang
(74) *Attorney, Agent, or Firm* — Morgan, Lewis & Bockius LLP

(57) ABSTRACT

A high-strength structural steel material having excellent fatigue crack propagation inhibitory characteristics according to an aspect of the present invention contains, by weight, 0.02-0.12% of C, 1.7-2.5% of Mn, 0.01-0.8% of Si, 0.005-0.5% of Al, and the balance Fe and unavoidable impurities, wherein a microstructure of the structural steel sheet material is divided into a surface layer portion outside and a central portion inside along a thickness direction; the surface layer portion comprises tempered bainite as a matrix structure, fresh martensite as a second structure, and austenite as a residual structure; and the central portion comprises lath bainite.

11 Claims, 2 Drawing Sheets

(a)

(b)

(51) Int. Cl.
*C22C 38/02* (2006.01)
*C22C 38/06* (2006.01)
*C22C 38/08* (2006.01)
*C22C 38/12* (2006.01)
*C22C 38/14* (2006.01)
*C22C 38/16* (2006.01)
*C22C 38/32* (2006.01)
*C21D 8/02* (2006.01)

(52) U.S. Cl.
CPC ............ *C22C 38/001* (2013.01); *C22C 38/02* (2013.01); *C22C 38/06* (2013.01); *C22C 38/08* (2013.01); *C22C 38/12* (2013.01); *C22C 38/14* (2013.01); *C22C 38/16* (2013.01); *C22C 38/32* (2013.01); *C21D 2211/001* (2013.01); *C21D 2211/002* (2013.01); *C21D 2211/008* (2013.01)

(56) References Cited

U.S. PATENT DOCUMENTS

| | | |
|---|---|---|
| 2013/0276940 A1 | 10/2013 | Nakajima et al. |
| 2016/0017466 A1 | 1/2016 | Shibata et al. |
| 2016/0177427 A1 | 6/2016 | Takashima et al. |
| 2017/0029914 A1 | 2/2017 | Hayashi |
| 2021/0071279 A1 | 3/2021 | Cho et al. |

FOREIGN PATENT DOCUMENTS

| | | |
|---|---|---|
| CN | 111566247 A | 8/2020 |
| EP | 0589424 A2 | 9/1993 |
| EP | 0709480 A1 | 5/1996 |
| EP | 2949772 A1 | 12/2015 |
| EP | 3040436 A1 | 7/2016 |
| EP | 3042976 A1 | 7/2016 |
| IN | 2367/KOLNP/2013 A1 | 11/2013 |
| JP | H06-004903 | 1/1994 |
| JP | H07-100814 B2 | 11/1995 |
| JP | 2000-017379 A | 1/2000 |
| JP | 2002-020835 A | 1/2002 |
| JP | 2003-342673 A | 12/2003 |
| JP | 2011-184754 A | 9/2011 |
| JP | 2013-147733 A | 8/2013 |
| KR | 10-1996-009174 B1 | 7/1996 |
| KR | 10-0165151 B1 | 1/1999 |
| KR | 10-0833076 | 5/2008 |
| KR | 100833076 B1 * | 5/2008 |
| KR | 10-1253958 B1 | 4/2013 |
| KR | 10-2013-0114239 A | 10/2013 |
| KR | 10-2016-0033227 A | 3/2016 |
| KR | 10-2016-0090865 A | 8/2016 |
| KR | 10-2019-0077183 A | 3/2019 |
| WO | 2014/162680 A1 | 10/2014 |
| WO | 2015/030210 A1 | 3/2015 |

OTHER PUBLICATIONS

Chinese Office Action dated May 21, 2021 issued in Chinese Patent Application No. 201880084275.4 (with English translation).
International Search Report dated Feb. 22, 2019 issued in International Patent Application No. PCT/KR2018/014523 (along with English translation).
Extended European Search Report dated Sep. 3, 2020 issued in European Search Report dated Sep. 3, 2020.

* cited by examiner

[Fig. 1]
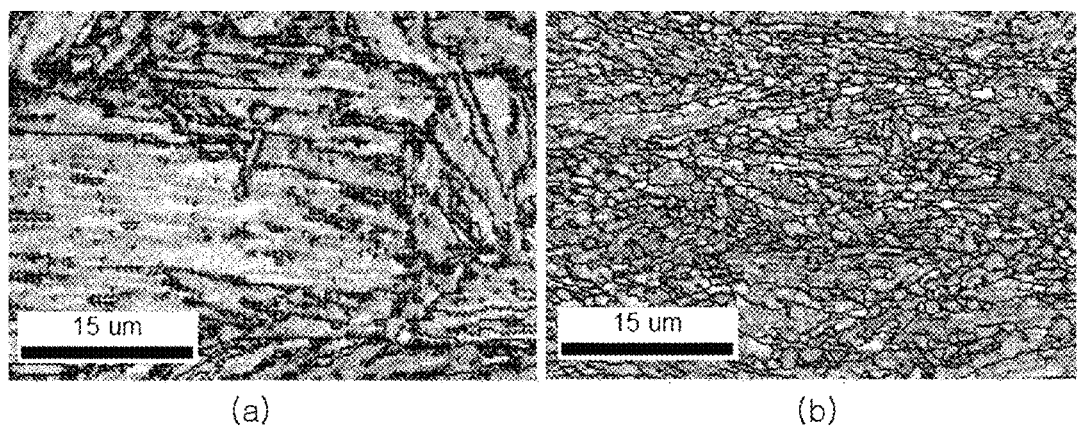
(a)          (b)
[Fig. 2]
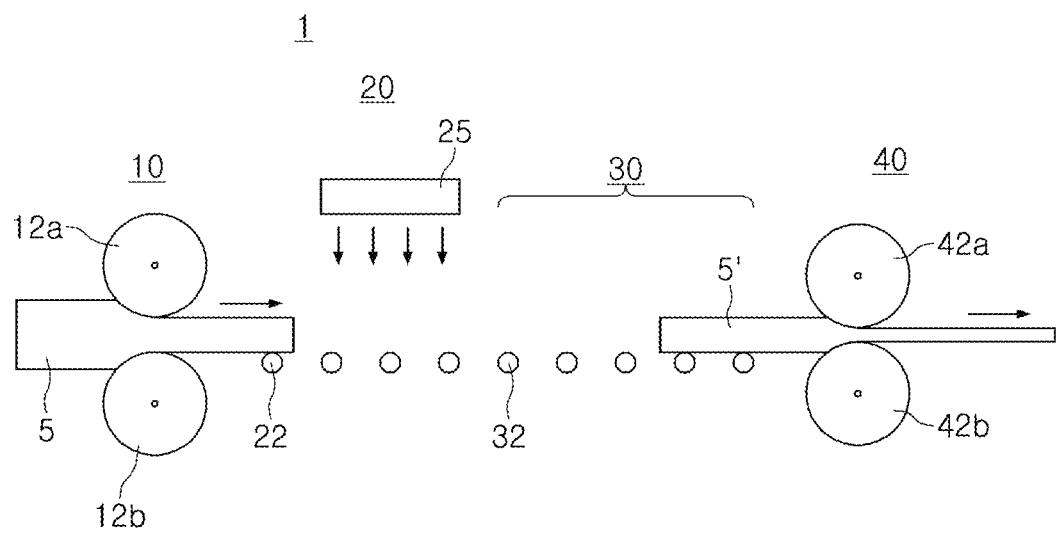

[Fig. 3]
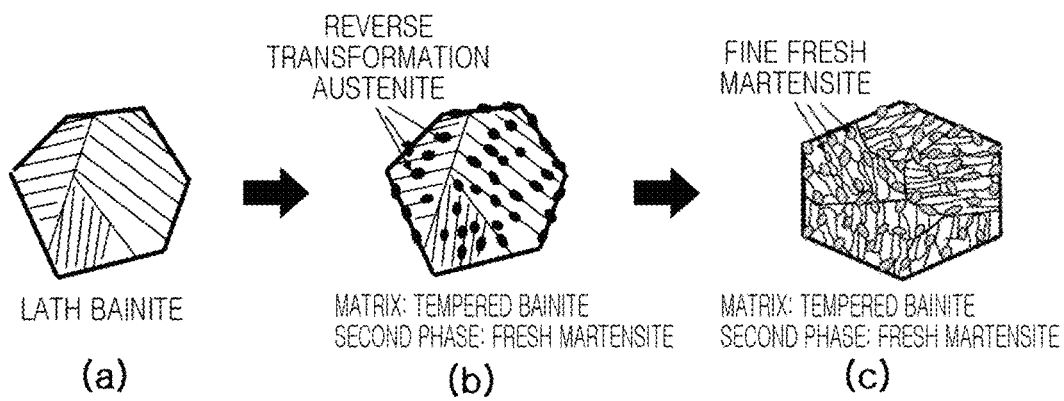
[Fig. 4]
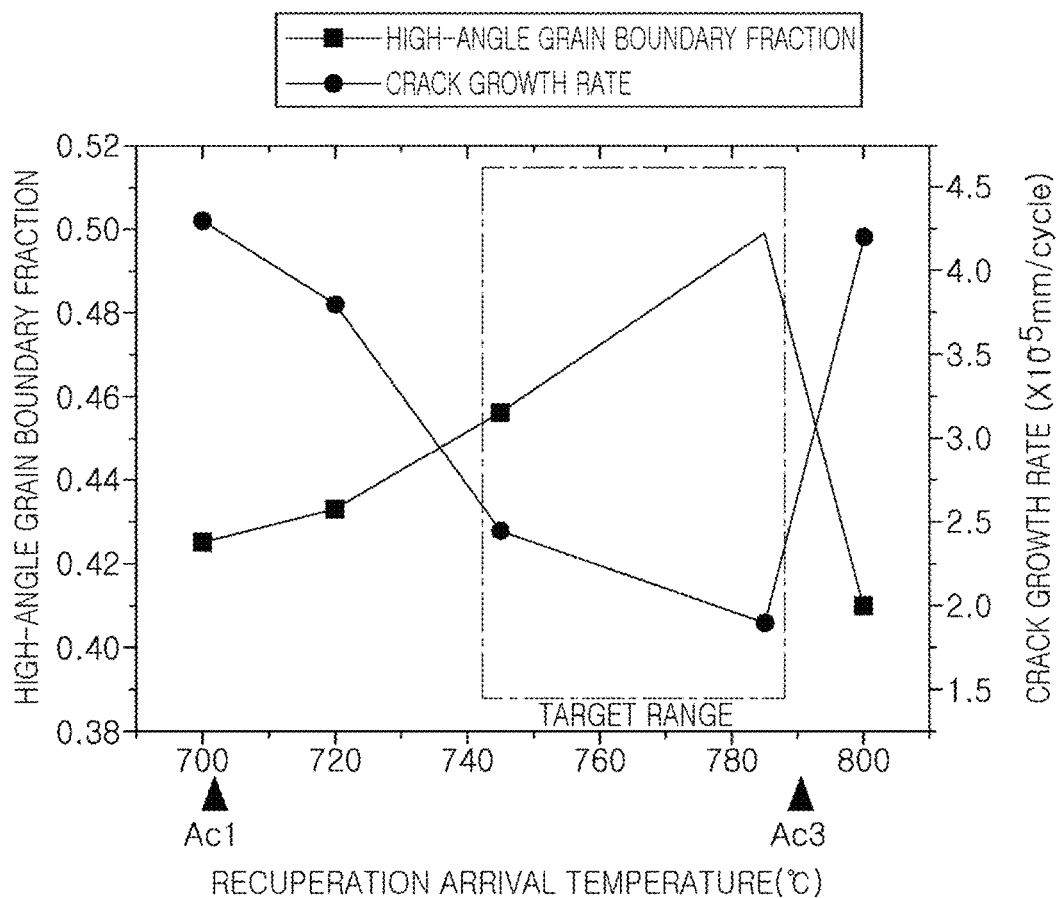

HIGH-STRENGTH STRUCTURAL STEEL MATERIAL HAVING EXCELLENT FATIGUE CRACK PROPAGATION INHIBITORY CHARACTERISTICS AND MANUFACTURING METHOD THEREFOR

CROSS-REFERENCE OF RELATED APPLICATIONS

This application is the U.S. National Phase under 35 U.S.C. § 371 of International Patent Application No. PCT/KR2018/014523, filed on Nov. 23, 2018, which in turn claims the benefit of Korean Application No. 10-2017-0179246, filed on Dec. 26, 2017, the entire disclosures of which applications are incorporated by reference herein.

TECHNICAL FIELD

The present disclosure relates to a structural steel material used in structures such as buildings, bridges, and the like, and a manufacturing method therefor, and in detail, relates to a structural steel material effectively securing fatigue crack propagation inhibitory characteristics and high strength characteristics by optimizing a steel composition, a microstructure, and a manufacturing process, and a method therefor.

BACKGROUND ART

In structural steel materials used in structures such as buildings, bridges, and the like, repeated stresses are continuously applied because of the nature of a use environment thereof, so it is very important to secure fatigue resistance characteristics of the material in order to secure the overall stability of the structure. In particular, as structures have recently become very large, demands for weight reduction and securing rigidity of the structure are increasing, and accordingly, a use of high-strength materials is increasing. However, as the strength of the material increases, the stress concentrated around the cracks generated in the material increases at the same time, so there is a problem that a rate of crack propagation of the material may also increase. Fatigue cracks of the steel material are that propagation of fatigue cracks occurred in a stress concentration portion of the steel material along the steel material. In particular, in the case of the structural steel material provided to the structure, since it is indispensable to have a welding part, and since there are a large number of defective parts, it is actually impossible to prevent the occurrence of fatigue cracks themselves. Therefore, in order to improve a fatigue life of the steel material provided in the structure, rather than preventing the occurrence of fatigue cracks themselves, it is more important to slow down a propagation rate of fatigue cracks from a state in which the fatigue cracks are already present to the other part.

Regarding to a technology to slow down the fatigue crack growth rate of the steel material, Patent Document 1 discloses a steel sheet having improved fatigue crack growth inhibitory characteristics by crossing a boundary between crystal grains having a direction. Specifically, Patent Document 1 limits the crack crosses the boundary between the crystal grains in which the (100) plane of the ferrite crystal is parallel to the direction (ND) perpendicular to the surface of the steel plate and the crystal grains in which the (111) plane of the ferrite crystal is parallel to the direction perpendicular to the steel plate to at least one place per 30 μm. Alternatively, Patent Document 1 limits the ratio of the (111) and (100) plane fractions of ferrite to 1.25 to 2.0 on the measurement plane parallel to the surface of the steel plate. However, since Patent Document 1 mainly discloses ferrite, there is a technical disadvantage that can correspond only to steel materials having tensile strength of 500 MPa or less.

Although not directly related to fatigue resistance characteristics, Patent Document 2 discloses a technique modifying a structure of a surface layer region of the steel material to improve brittle crack propagation stop characteristics. In particular, Patent Document 2 discloses a technique of securing brittle crack propagation stop characteristics by mainly including equiaxed ferrite crystal grains and elongated ferrite crystal grains having fine grained surface layer regions, and having a strength ratio of 1.5 to 4.0 of the (100) plane. However, since Patent Document 2 is also mainly made of elongated ferrite, since it cannot be applied to high-strength steel materials of 700 MPz or more, and it is necessary to perform rolling while a surface layer portion is heated by recuperation to refine the structure, there is technical difficulty in that a precise temperature is not possible during a rolling process.

(Patent Document 1) Japanese Patent Application No. 2000-017379 (published on Jan. 18, 2000)

(Patent Document 2) Japanese Patent Application No. 2002-020835 (published on Jan. 23, 2002)

DISCLOSURE

Technical Problem

An aspect of the present disclosure is to provide a high-strength structural steel material effectively securing fatigue crack propagation inhibitory characteristics and high strength characteristics and a manufacturing method therefor.

Technical problems to be achieved in the present disclosure are not limited to the technical problems mentioned above, and other technical problems, not mentioned, will be clearly understood by those skilled in the art from the following description.

Technical Solution

According to an aspect of the present disclosure, a high-strength structural steel material having excellent fatigue crack propagation inhibitory characteristics, includes, by weight %:

0.02% to 0.12% of C, 1.7% to 2.5% of Mn, 0.01% to 0.8% of Si, 0.005% to 0.5% of Al, and a balance Fe and unavoidable impurities, wherein a microstructure of the structural steel material is divided into a surface layer portion outside and a central portion inside in a thickness direction, the surface layer portion includes tempered bainite as a matrix structure, fresh martensite as a second structure, and austenite as a residual structure, and the central portion includes lath bainite.

The surface layer portion is divided into an upper surface layer portion on an upper side and a lower surface layer portion on a lower side, and the upper surface layer portion and the lower surface layer portion may be provided with a thickness of 3% to 10%, respectively, to the thickness of the steel material.

The matrix structure and the second structure may be included in the surface layer portion in a volume fraction of 95% or more.

The residual structure maybe included in the surface layer portion in a volume fraction of 5% or less.

An average particle diameter of the tempered bainite may be 3 μm or less (excluding 0 μm).

An average particle diameter of the fresh martensite may be 3 μm or less (excluding 0 μm).

The steel material may further include one or more of, by weight %:

0.005% to 0.1% of Nb, 0.005% to 0.1% of Ti, 0.02% or less of P, 0.004% or less of B, 0.015% or less of N, 0.01% or less of S, 0.01% to 1.0% of Cu, 0.01% to 2.0% of Ni, 0.01% to 1.0% of Mo, 0.05% to 1.0% of Cr, 0.01% to 0.4% of V, and 0.006% or less of Ca.

A yield strength of the steel material may be 690 MPa or more.

A tensile strength of the steel material may be 800 MPa or more.

A high-angle grain boundary fraction of the surface layer portion may be 45% or more.

A fatigue crack growth rate of the steel material may be $2.5 \times 10^{-5}$ mm/cycle.

According to an aspect of the present disclosure, a method of manufacturing a high-strength structural steel material having excellent fatigue crack propagation inhibitory characteristics, includes operations of:

reheating a slab including, by weight %, 0.02% to 0.12% of C, 1.7% to 2.5% of Mn, 0.01% to 0.8% of Si, 0.005% to 0.5% of Al, and a balance Fe and unavoidable impurities, to a temperature in a range of 1050° C. to 1250° C.;

rough rolling the slab in a temperature range of Tnr to 1150° C.;

primary cooling the rough-rolled steel material to a temperature in a range of Ms to Bs° C. at a cooling rate of 5° C./s or higher, based on a temperature of the surface layer portion of the rough-rolled steel material;

performing a recuperative treatment such that the surface layer portion of the primary-cooled steel material to be reheated by recuperation, and reheating the surface layer portion of the steel material to a temperature in a range of $(Ac_1+40°\ C.)\sim(Ac_3-5°\ C.)$;

finish rolling the steel material, which performed the recuperative treatment, to a temperature in a range of Bs to Tnr° C.; and secondary cooling the finish-rolled steel material to a temperature in a range of 250° C. to 500° C. at a cooling rate of 5° C./s or higher.

The slab may further include one or more of, by weight %, 0.005% to 0.1% of Nb, 0.005% to 0.1% of Ti, 0.02% or less of P, 0.004% or less of B, 0.015% or less of N, 0.01% or less of S, 0.01% to 1.0% of Cu, 0.01% to 2.0% of Ni, 0.01% to 1.0% of Mo, 0.05% to 1.0% of Cr, 0.01% to 0.4% of V, and 0.006% or less of Ca.

The surface layer portion may be a region from an outer surface of the steel material to a depth of 3% to 10% to the thickness of the steel material toward a central axis of the steel material.

The primary cooling may be performed immediately after the rough rolling.

A start temperature of the primary cooling may be $Ae_3+$ 100° C. or less, based on the temperature of the surface layer portion of the steel material.

Advantageous Effects

According to an aspect of the present disclosure, since a structure of a surface layer portion of a steel material is refined by a recuperative treatment, and a high-angle grain boundary fraction of the surface layer portion is increased by limiting a recuperative temperature, a high-strength structural steel material with effectively improved fatigue resistance characteristics, and a manufacturing method therefor may be provided.

In addition, according to an aspect of the present disclosure, a high-strength structural steel material having tensile strength of 800 Mpa or more and a manufacturing method therefor, by optimizing a steel component, a microstructure, and process conditions, while securing the fatigue crack propagation inhibitory characteristics, and a manufacturing method therefor may be provided.

DESCRIPTION OF DRAWINGS

FIG. 1 is a photograph observing a microstructure of a specimen of a high-strength structural steel material having excellent fatigue crack propagation inhibitory characteristics according to an embodiment of the present disclosure.

FIG. 2 is a view schematically showing an example of a facility for implementing a manufacturing method of the present disclosure.

FIG. 3 is a conceptual diagram illustrating changes in a microstructure of a surface layer portion by a recuperative treatment of the present disclosure.

FIG. 4 is a graph illustrating a relationship between a recuperative temperature and a high-angle grain boundary fraction and a fatigue crack growth rate.

BEST MODE FOR INVENTION

The present disclosure relates to a high-strength structural steel material having excellent fatigue crack propagation inhibitory characteristics and a manufacturing method therefor. Hereinafter, preferred embodiments of the present disclosure will be described. The embodiments of the present embodiment may be modified in various forms, and the scope of the present disclosure should not be construed as being limited to the embodiments described below. The embodiments are provided to explain the present disclosure in more detail to those of ordinary skilled in the art. Hereinafter, the steel composition of the present disclosure will be described in more detail. Hereinafter, unless otherwise indicated, %, representing the content of each element is based on weight.

According to an aspect of the present disclosure, a high-strength structural steel material having excellent fatigue crack propagation inhibitory characteristics, may include, by weight %: 0.02% to 0.12% of C, 1.7% to 2.5% of Mn, 0.01% to 0.8% of Si, 0.005% to 0.5% of Al, and a balance Fe and unavoidable impurities.

Carbon (C): 0.02% to 0.12%

Carbon (C) is the most important for forming bainite on a matrix and determining its strength in the present disclosure, so C needs to be contained in steel within an appropriate range. When the content of carbon (C) is less than a certain level, a quenching property is lowered and formation of bainite is suppressed, so that a problem in which the strength of the steel material is lowered may occur. In the present disclosure, a lower limit of the content of carbon (C) may be limited to 0.02% to ensure the strength of the steel material. On the other hand, when the content of carbon (C) exceeds a certain level, low-temperature toughness of the steel material may be lowered, such that an upper limit of the content of carbon (C) may be limited to 0.12%. Therefore, the content of carbon (C) may be in a range of 0.02% to 0.12%, and in the case of a steel material used as a steel structure for welding, the content of carbon (C) may be limited to a range of 0.03% to 0.08% in order to secure weldability.

Manganese (Mn): 1.7% to 2.5%

Manganese (Mn) is an element improving quenchability, and is a useful element enhancing strength by solid solution strengthening. In addition, when a content of manganese (Mn) is at a certain level or less, ferrite is easily formed, such that a structure of a surface layer portion desired by the present disclosure may not be obtained. In the present disclosure, to achieve such an effect, a lower limit of the content of manganese (Mn) may be limited to 1.7%. However, when manganese (Mn) is excessively added, since toughness in a welding portion may be greatly reduced due to an excessive increase in hardenability, in the present disclosure, an upper limit of the content of manganese (Mn) may be limited to 2.5%. Therefore, the content of manganese (Mn) may be in a range of 1.7% to 2.5%, and more preferably, the content of manganese (Mn) may be in a range of 1.8% to 2.3%.

Silicon (Si): 0.01% to 0.8%

Silicon (Si) is an element used as a deoxidizer, and is an element contributing to an effect of improving strength due to solid solution strengthening. To achieve such an effect, in the present disclosure, a lower limit of the content of silicon (Si) may be limited to 0.01%. However, when silicon (Si) is excessively added, low-temperature toughness of a base material as well as a welding portion, so in the present disclosure, an upper limit of the content of silicon (Si) may be limited to 0.8%. Therefore, the content of silicon (Si) of the present disclosure may be in a range of 0.01% to 0.8%, and the more preferable content of silicon (Si) may be in a range of 0.05% to 0.5%.

Aluminum (Al): 0.005% to 0.5%

Aluminum (Al) is a representative deoxidizer, and is also an element contributing to improving strength. In order to achieve this effect, in the present disclosure, a lower limit of a content of aluminum (Al) may be limited to 0.005%. However, when aluminum (Al) is excessively added, it may cause clogging of a nozzle for continuous casting during continuous casting, so in the present disclosure, an upper limit of the content of aluminum (Al) may be limited to 0.5%. Therefore, the content of aluminum (Al) of the present disclosure may be in a range of 0.005% to 0.5%, and the more preferable content of aluminum (Al) may be in a range of 0.01% to 0.3%.

The high-strength structural steel material having excellent fatigue crack propagation inhibitory characteristics according to an aspect of the present disclosure may further include one type or two or more types of, by weight %: 0.005% to 0.1% of Nb, 0.005% to 0.1% of Ti, 0.02% or less of P, 0.004% or less of B, 0.015% or less of N, 0.01% or less of S, 0.01% to 1.0% of Cu, 0.01% to 2.0% of Ni, 0.01% to 1.0% of Mo, 0.05% to 1.0% of Cr, 0.01% to 0.4% of V, and 0.006% or less of Ca.

Niobium (Nb): 0.005% to 0.1%

Niobium (Nb) is one of elements playing the most important role in manufacturing TMCP steel, and is also an element greatly contributing to improving strength of a base material and a welding portion through precipitation thereof in a form of carbides or nitrides. In addition, niobium (Nb) solid-solitioned during reheating of a slab inhibits austenite recrystallization, and niobium (Nb) in a surface layer portion contributes to the formation of bainite during slab cooling after rough rolling. Therefore, in the present disclosure, a lower limit of a content of niobium (Nb) may be limited to 0.005% to achieve such an effect. However, when niobium (Nb) is excessively added, coarse precipitates are generated, which may generate brittle cracks at corners of the steel material. Thus, in the present disclosure, an upper limit of the content of niobium (Nb) may be limited to 0.1%. Therefore, the content of niobium (Nb) of the present disclosure may be in a range of 0.005% to 0.1%, and the more preferable content of niobium (Nb) may be in a range of 0.01% to 0.05%.

Titanium (Ti): 0.005% to 0.1%

Titanium (Ti) is an element maximizing an effect of adding boron (B), an important element for improving quenchability. That is, titanium (Ti) is combined with nitrogen (N) in steel to form TiN, and thus can inhibit formation of BN, thereby increasing a content of solid solution boron (B). In addition, since the TiN precipitates pinned austenite grains to suppress grain coarsening, low-temperature toughness can be greatly improved. Therefore, in the present disclosure, a lower limit of titanium (Ti) may be limited to 0.005% to achieve this effect. On the other hand, when titanium (Ti) is excessively added, it may cause clogging of a nozzle for continuous casting during continuous casting or it is precipitated in the central portion of the slab, which may cause a decrease in low-temperature toughness. Thus, an upper limit of the content of titanium (Ti) may be limited to 0.1%. Therefore, the content of titanium (Ti) of the present disclosure may be in a range of 0.005% to 0.1%, and the more preferable content of titanium (Ti) may be in a range of 0.01% to 0.05%.

Phosphorous (P): 0.02% or Less

Phosphorus (P) is an element that is advantageous for improving strength and for corrosion resistance, but P is advantageous to make a content of P as low as possible because P is an element that greatly inhibits impact toughness. Therefore, in the present disclosure, an upper limit of the content of phosphorus (P) may be limited to 0.02%. However, since phosphorus (P) is an inevitably introduced impurity in a steelmaking process, it is not desirable from an economic point of view to control the content of P to a level of less than 0.001%. Therefore, the content of phosphorus (P) of the present disclosure may be in a range of 0.001% to 0.02%, and the more preferable the content of phosphorus (P) may be in a range of 0.001% to 0.01%

Boron (B): 0.004% or Less

Boron (B) is a relatively inexpensive element, but is a beneficial element that can effectively increase hardenability even with a small amount. In addition, boron (B) is also an element that greatly contributes to the formation of bainite in the surface layer portion during cooling after rough rolling. However, when B is excessively added, $Fe_{23}(CB)_6$ may be formed to rather reduce the hardenability, and low-temperature toughness may also be significantly reduced. Therefore, in the present disclosure, an upper limit of a content of boron (B) may be limited to 0.004%. However, when considering effects such as an increase in strength and formation of bainite in the surface layer portion, the preferred content of boron (B) of the present disclosure may be in a range of 0.0005% to 0.004%.

Nitrogen (N): 0.015% or Less

Nitrogen (N) is an element that contributes to improving strength of steel materials. However, when an addition amount of N is excessive, toughness of the steel material may be greatly reduced, so in the present disclosure, an upper limit of a content of nitrogen (N) may be limited to 0.015%. However, nitrogen (N) is also an inevitably introduced impurity in a steelmaking process, and controlling the content of nitrogen (N) to a level of less than 0.0015% is undesirable from an economic point of view. Therefore, the content of phosphorus (P) of the present disclosure may be in a range of 0.0015% to 0.015%, and the more preferable content of phosphorus (P) may be in a range of 0.0015% to 0.01%.

Sulfur (S): 0.01% or Less

Sulfur (S) is an element that significantly inhibits impact toughness by forming a non-metallic inclusion such as MnS, so it is advantageous to control it as low as possible. Therefore, in the present disclosure, an upper limit of a content of sulfur (S) may be limited to 0.01%. However, sulfur (S) is also an inevitably introduced impurity in a steelmaking process, and it is not desirable from the economical point of view to control it to a level of less than 0.001%. Therefore, the content of sulfur (S) of the present disclosure may be in a range of 0.001% to 0.01%, and the more preferable content of sulfur (S) may be in a range of 0.001% to 0.005%.

Copper (Cu): 0.01% to 1.0%

Copper (Cu) is an element capable of increasing strength while minimizing toughness of a base material. Therefore, in the present disclosure, a lower limit of a content of copper (Cu) may be limited to 0.01% to achieve this effect. However, when an addition amount of copper (Cu) is excessive, a possibility of deterioration in a quality of a surface of a final product increases, so in the present disclosure, an upper limit of the content of copper (Cu) may be limited to 1.0%. Therefore, the content of copper (Cu) of the present disclosure may be in a range of 0.01% to 1.0%, and the more preferable content of copper (Cu) may be in a range of 0.01% to 0.5%.

Nickel (Ni): 0.01% to 2.0%

Nickel (Ni) is an element that can simultaneously improve the strength and toughness of a base material, so in the present disclosure, a lower limit of nickel (Ni) may be limited to 0.01% to ensure strength and toughness. However, nickel (Ni) is an expensive element, and an excessive addition is not desirable from an economical point of view, and when an addition amount of nickel (Ni) is excessive, weldability may be deteriorated, so in the present disclosure, an upper limit of the content of nickel (Ni) may be limited to 2.0%. Therefore, the content of nickel (Ni) of the present disclosure may be in a range of 0.01% to 2.0%, and the more preferable content of nickel (Ni) may be in a range of 0.1% to 1.0%

Molybdenum (Mo): 0.01% to 1.0%

Molybdenum (Mo) is an element that can greatly improve hardenability even with a small amount added, so can inhibit generation of ferrite, and accordingly, can significantly improve the strength of the steel material. Therefore, in the present disclosure, a lower limit of the content of molybdenum (Mo) may be limited to 0.01% in terms of securing the strength. However, when an addition amount of molybdenum (Mo) is excessive, hardness of a welding portion may be excessively increased and the toughness of the base material may be reduced, and so an upper limit of the content molybdenum (Mo) of the present disclosure may be limited to 1.0%. Therefore, the content of molybdenum (Mo) of the present disclosure may be in a range of 0.01% to 1.0%, the more preferably content of molybdenum (Mo) may be in a range of 0.1% to 0.5%.

Chromium (Cr): 0.05% to 1.0%

Chromium (Cr) is an element that effectively contributes to an increase in strength by increasing hardenability, so in the present disclosure, a lower limit of a content of chromium (Cr) may be limited to 0.05% to secure strength. However, when an addition amount of chromium (Cr) is excessive, weldability is greatly reduced, so in the present disclosure, an upper limit of the content of chromium (Cr) may be limited to 1.0%. Therefore, the content of chromium (Cr) of the present disclosure may be in a range of 0.05% to 1.0%, and the more preferable content of chromium (Cr) may be in a range of 0.1% to 0.5%.

Vanadium (V): 0.01% to 0.4%

Vanadium (V) has a lower solid solution temperature than other alloy compositions, and can be prevented from falling in strength of a welding portion by being precipitated in a welding heat-affected portion. Therefore, in the present disclosure, a lower limit of a content of vanadium (V) may be limited to 0.01% in order to achieve this effect. However, when vanadium (V) is excessively added, toughness may be deteriorated, so in the present disclosure, the upper limit of vanadium (V) may be limited to 0.4%. Therefore, the content of vanadium (V) of the present disclosure may be in a range of 0.01% to 0.4%, and the more preferred content of vanadium (V) may be in a range of 0.02% to 0.2%.

Calcium (Ca): 0.006% or Less

Calcium (Ca) is mainly used as an element controlling a shape of non-metallic inclusions such as MnS and improving low-temperature toughness. However, an excessive addition of Calcium (Ca) may cause a large amount of CaO—CaS formation and formation of coarse inclusions, which may cause problems such as a decrease in cleanliness of steel and a decrease in weldability in a field. Therefore, in the present disclosure, an upper limit of a content of calcium (Ca) may be limited to 0.006%, and an upper limit of the more preferred content of calcium (Ca) may be 0.005%.

The present disclosure, in addition to the above-described steel composition may include Fe and unavoidable impurities. The unavoidable impurities can be unintentionally incorporated in an ordinary steel manufacturing process, and cannot be completely excluded, and the meaning can be easily understood by those skilled in the ordinary steel manufacturing field. In addition, the present disclosure does not exclude an addition of the composition other than the steel composition mentioned above entirely.

The thickness of the high-strength structural steel material having excellent fatigue crack propagation inhibitory characteristics according to an aspect of the present disclosure is not particularly limited, but may preferably be a thick structural material of 20 mm or more.

Hereinafter, a microstructure of the present disclosure will be described in more detail.

The high-strength structural steel material having excellent fatigue crack propagation inhibitory characteristics according to an aspect of the present disclosure may be divided into a surface layer portion outside and a central portion inside in a thickness direction, and the surface layer portion and the central portion may be divided into microstructures. The surface layer portion is divided into an upper surface layer portion on an upper side of the steel material and a lower surface layer portion on a lower side of the steel material, and the thickness of the upper surface layer portion and the lower surface layer portion may be 3% to 10% of the thickness of the steel material, respectively. Preferably, the thickness of the upper surface layer portion and the lower surface layer portion may be 5% to 7% of the thickness of the steel material, respectively.

The surface layer portion may include tempered bainite as a matrix structure, fresh martensite as a second structure, and may be provided as a mixed structure including austenite as a residual structure, and the central portion may be provided as a structure including lath bainite. Therefore, the surface layer portion and the center portion can be divided into microstructures.

A sum of volume fractions of the tempered bainite structure and the fresh martensite structure in the surface layer portion may be 95% or more, and the volume fraction of residual austenite in the surface layer portion may be 5% or less. In addition, the tempered bainite structure in the surface layer portion may be included in a volume fraction of 85% or more, and the fresh martensite structure may be included in 10% or less. The sum of the volume fractions of the tempered bainite structure and fresh martensite structure in the surface layer portion may be 100%, and in this case, the volume fraction of residual austenite in the surface layer portion may be 0%.

The lath bainite structure may be included in a volume fraction of 95% or more in the central portion.

In the high-strength structural steel material having excellent fatigue propagation inhibitory characteristics according to an aspect of the present disclosure, the surface layer portion may be refined by a recuperative treatment, provided with a lath bainite structure in the central portion of the final product, while the tempered bainite structure and fresh martensite structure of the surface layer portion may be provided as a fine structure having an average particle diameter of 3 μm or less (excluding 0 μm), respectively.

FIG. 1 is a photograph observing a microstructure of a high-strength structural steel specimen according to an embodiment of the present disclosure. Specifically, A in FIG. 1?) is a photograph of observing a microstructure of a center portion, B in FIG. 1 is a photograph of observing a microstructure of a surface layer portion. As shown in FIGS. A and B in 1, it can be seen that the center portion of the steel material is provided with a coarse lath bainite structure, while the surface layer portion has a tempered bainite structure, a fresh martensite structure, and a residual austenite structure, having an average particle diameter of 3 μm, respectively. Therefore, it can be seen that the structural steel material according to an embodiment of the present disclosure can effectively improve brittle crack propagation resistance, by miniaturizing the structure of the surface layer portion of the steel material by the recuperative treatment.

In the structural steel material according to an aspect of the present disclosure, a structure of a surface layer portion is refined by the recuperative treatment, such that the steel material may have excellent fatigue crack propagation inhibitory characteristics having a high-angle grain boundary fraction of the surface layer portion of 45% or more and a fatigue crack growth rate of $2.5 \times 10^{-5}$ mm/cycle.

In addition, the structural steel material according to an aspect of the present disclosure has a yield strength of 690 MPa or more, and a tensile strength of 800 MPa or more, so that it is possible to secure suitable rigidity as a structural material.

Hereinafter, a manufacturing method of the present disclosure will be described in more detail.

According to an aspect of the present disclosure, a high-strength structural steel material having fatigue crack propagation inhibitory characteristics may be manufactured by operations of: reheating a slab provided with the above-described composition; rough rolling the slab; primary cooling the rough-rolled steel material; performing a recuperative treatment such that the surface layer portion of the primary-cooled steel material is reheated by recuperation; and finish rolling the reheated steel.

Since the slab alloy composition of the present disclosure corresponds to the alloy composition of the steel material described above, the description of the slab alloy composition of the present disclosure is replaced by the description of the alloy composition of the steel material described above.

Slab Reheating

A slab provided with the steel composition described above is reheated. In order to sufficiently solid-solubilize carbonitrides of Ti and Nb formed during casting, a lower limit of a reheating temperature range of the slab may be limited to 1050° C. However, when the reheating temperature is excessively high, there is a possibility that austenite may become coarse, and it takes excessive time for a temperature of the surface layer portion of the steel material after rough rolling to reach a primary cooling start temperature, so an upper limit of the reheating temperature range may be limited to 1250° C. Therefore, the slab reheating temperature of the present disclosure may be in a range of from 1050° C. to 1250° C.

Rough Rolling

In order to adjust the shape of the slab and to destroy a casting structure such as dendrites, or the like, rough heating is performed after the reheating. In order to control a microstructure, rough rolling is performed at a temperature (Tnr) or higher at which austenite recrystallization stops, and an upper limit of a rough rolling temperature may be limited to 1150° C. in consideration of the primary cooling start temperature. Therefore, the rough rolling temperature of the present disclosure may be in a range of Tnr to 1150° C.

Primary Cooling

After completion of the rough rolling, primary cooling is performed until a temperature of the surface layer portion reaches a range of Ms to Bs° C. in order to form lath bainite in the surface layer portion of the steel material. When a cooling rate of the primary cooling is less than 5° C./s, a polygonal ferrite or granular bainite structure other than the lath bainite structure is formed on the surface layer portion, so the cooling rate of the primary cooling may be 5° C./s or higher. In addition, a method of the primary cooling is not particularly limited, but water cooling is preferred from a viewpoint of cooling efficiency. Meanwhile, when a starting temperature of the primary cooling is excessively high, there is a possibility that the lath bainite structure formed on the surface layer portion by the primary cooling may become coarse, so the starting temperature of the primary cooling may be preferably limited to Ae3+100° C. or lower.

In order to maximize a recuperative treatment effect, the primary cooling of the present disclosure is preferably performed immediately after rough rolling. FIG. 2 is a view schematically showing an example of a facility 1 for implementing the manufacturing method of the present disclosure. Along a moving path of a slab 5, a rough rolling device 10, a cooling device 20, a recuperator 30, and a finish rolling device 40 are sequentially disposed, and the rough rolling device 10 and the finish rolling device 40 is provided with rough rolling rollers 12a and 12b and finish rolling rollers 42a and 42b, respectively, to perform rolling of the slab 5. The cooling device 20 may include a bar cooler 25 for spraying coolant and an auxiliary roller 22 for guiding a movement of the rough-rolled slab 5. The bar cooler 25 is more preferably disposed in an immediate rear of the rough rolling device 10 in terms of maximizing a recuperative treatment effect. The recuperator 30 is disposed at the rear of the cooling device 20, and the rough-rolled slab 5 may be recuperated while moving along the auxiliary roller 32. A slab 5' after the recuperative treatment is finished may be moved to the finish rolling device 40 to be performed finish rolling. Such a facility 1 is merely an example of a facility for performing the present disclosure, and the present disclosure should not be interpreted as being limited to the facility shown in FIG. 2.

Recuperative Treatment

After performing the primary cooling, a recuperative treatment to wait for a surface layer portion of the steel material to be reheated due to high heat in the central portion of the steel material, and the recuperative treatment may be performed until the temperature of the surface layer portion of the steel material reaches a temperature within a range of ($Ac_1$+40° C.) to ($Ac_3$−5° C.). By the recuperative treatment, lath bainite of the surface layer portion may be transformed into a fine tempered bainite structure, and some of the lath bainite of the surface layer portion may be reverse-transformed into austenite.

FIG. 3 is a conceptual diagram schematically illustrating changes in a microstructure of a surface layer portion by a recuperative treatment of the present disclosure.

As shown in FIG. 3A, a microstructure of the surface layer portion immediately after the primary cooling may be provided as a lath bainite structure. As shown in FIG. 3B, as the recuperative treatment proceeds, lath bainite of the surface layer portion is transformed into a tempered bainite structure, and some of the lath bainite of the surface layer portion may be reverse-transformed into austenite. As finish rolling and secondary cooling is performed after the recuperative treatment, as shown in FIG. 3C, a tempered bainite matrix structure and a fresh martensite two-phase mixed structure may be formed, and some austenite structures may remain.

A relationship between a temperature reaching the recuperative treatment and a high-angle grain boundary fraction and a fatigue crack growth rate is as shown in FIG. 4. As shown in FIG. 4, when the temperature reaching the recuperative treatment of the surface layer portion is less than (Ac1+40° C.) the high-angle grain boundary fraction of 15 degrees or more is not sufficiently formed, and the fatigue crack propagation rate may exceed $2.5 \times 10^{-5}$ mm/cycle. Therefore, in the present disclosure, a lower limit of the temperature reaching the recuperative treatment of the surface layer portion may be limited to (Ac1+40° C.). In addition, when the temperature reaching the recuperative treatment of the surface layer portion exceeds ($Ac_3$−5° C.), there is no great advantage regarding a fatigue crack growth rate, and the structure of the surface layer portion is likely to become coarse again, so in the present disclosure, an upper limit of the temperature reaching the recuperative treatment of the surface layer portion may be limited to ($Ac_3$−5° C.). That is, in the present disclosure, the temperature reaching the recuperative treatment of the surface layer portion may be limited to the temperature range of ($Ac_1$+40° C.) to ($Ac_3$−5° C.), such that properties of refining the structure of the surface layer portion, a high angle grain boundary of 45% or more of 15 degrees or more, and a fatigue crack growth rate of $2.5 \times 10^{-5}$ mm/cycle or less may be effectively secured.

Finish Rolling

Finish rolling may be performed to introduce a non-uniform microstructure into the austenitic structure of the rough-rolled steel material. The finish rolling is performed at a temperature within a range of the bainite transformation start temperature (Bs) or higher and the austenite recrystallization temperature (Tnr) or lower.

Secondary Cooling

After completion of the finish rolling, cooling is performed to cool at a cooling rate of 5° C./s or higher to form a lath bainite structure in the central portion of the steel material. A method of the secondary cooling is not particularly limited, but water cooling is preferred from a viewpoint of cooling efficiency. A cooling end temperature of the secondary cooling may be 250 to 500° C. When the cooling end temperature of the secondary cooling exceeds 500° C. of the steel material, a lath bainite structure may not be formed in the central portion, and when the cooling end temperature of the secondary cooling is less than 250° C. of the steel material, warpage may occur in the steel material.

Mode for Invention

Hereinafter, the present disclosure will be described in more detail through embodiments. The present disclosure is not limited to the following embodiments. This is because the scope of the present disclosure is determined by the items described in the claims and the items reasonably inferred therefrom.

Slabs were prepared having the composition of Table 1 below, and Table 2 shows results of calculating a transformation temperature of each slab.

TABLE 1

|   | C | Si | Mn | P | S | Al | Ni | Cu | Cr | Mo | Ti | Nb | V | B | N* |
|---|---|---|---|---|---|---|---|---|---|---|---|---|---|---|---|
| IS A | 0.06 | 0.15 | 2.2 | 0.013 | 0.002 | 0.015 | 0.4 | 0.25 | 0.35 | 0.16 | 0.016 | 0.04 | 0.04 | 0.0012 | 0.00040 |
| IS B | 0.064 | 0.35 | 1.95 | 0.013 | 0.005 | 0.032 | 0.8 | 0 | 0 | 0.35 | 0.013 | 0.02 | 0.00 | 0.0015 | 0.00054 |
| IS C | 0.057 | 0.3 | 2.15 | 0.012 | 0.002 | 0.023 | 0.33 | 0.16 | 0 | 0 | 0.015 | 0.04 | 0.00 | 0.004 | 0.00045 |
| IS D | 0.078 | 0.45 | 2.1 | 0.013 | 0.003 | 0.035 | 0.43 | 0 | 0.46 | 0 | 0.019 | 0.04 | 0.00 | 0.0008 | 0.00041 |
| IS E | 0.048 | 0.25 | 2.3 | 0.013 | 0.002 | 0.03 | 0 | 0.26 | 0 | 0 | 0.018 | 0.03 | 0.00 | 0.0016 | 0.00043 |
| CS F | 0.015 | 0.21 | 1.5 | 0.014 | 0.002 | 0.035 | 0 | 0 | 0 | 0 | 0.012 | 0.03 | 0.00 | 0.0021 | 0.00038 |
| CS G | 0.18 | 0.32 | 0.8 | 0.013 | 0.001 | 0.04 | 0 | 0.02 | 0 | 0 | 0.016 | 0.03 | 0.00 | 0.0025 | 0.00035 |
| CS H | 0.08 | 0.42 | 1.22 | 0.011 | 0.003 | 0.024 | 0 | 0 | 0.48 | 0 | 0.012 | 0.00 | 0.00 | 0.0013 | 0.00032 |
| CS I | 0.079 | 0.25 | 1.4 | 0.016 | 0.004 | 0.03 | 0 | 0 | 0 | 0.07 | 0.01 | 0.04 | 0.00 | 0.0001 | 0.00050 |

* IS: Inventive steel
* CS: Comparative steel

TABLE 2

|   | Bs (° C.) | Tnr (° C.) | Ms (° C.) | Ac3 (° C.) | Ac1 (° C.) |
|---|---|---|---|---|---|
| IS A | 563 | 989 | 434 | 792 | 703 |
| IS B | 579 | 837 | 436 | 788 | 699 |
| IS C | 609 | 957 | 444 | 785 | 703 |
| IS D | 572 | 921 | 429 | 778 | 714 |
| IS E | 610 | 938 | 449 | 785 | 706 |
| CS F | 691 | 933 | 487 | 821 | 713 |
| CS G | 709 | 967 | 439 | 783 | 724 |
| CS H | 665 | 794 | 462 | 818 | 730 |
| CS I | 677 | 988 | 462 | 797 | 715 |

* IS: Inventive steel
* CS: Comparative steel

The slab of Table 1 was subjected to rough rolling, primary cooling and recuperative treatment under the conditions of Table 3 below, and then subjected to finish rolling and secondary cooling under the conditions of Table 4 below. Results of physical properties manufactured under the conditions of Table 3 and Table 4 were shown in Table 5 below.

For each steel material, a high-angle grain boundary fraction, mechanical properties, and crack growth rates were measured. Among these, the high-angle grain boundary fraction is measured by an Electron Back Scattering Diffraction (EBSD) method. The high-angle grain boundary was obtained by measuring a 500 m×500 m region a ta step size of 0.5 m, and a grain boundary map having a crystal orientation difference between adjacent particles of 15 degrees or more was created. Three testing specimens were tensile tested in a plate width direction to obtain an average value of the yield strength (YS) and the tensile strength (TS). In addition, the fatigue crack growth test was performed according to an ASTM E647 standard. A crack growth direction of the Compact Tension testing specimen was perpendicular to a rolling direction, and a condition having a repetition rate of 25 Hz and a stress ratio (minimum stress/maximum stress) of 0.1 was used in an air state. The fatigue crack growth rate was based on a case in which a stress expansion coefficient range ($\Delta K$) is 20 MPa/m$^{0.5}$.

TABLE 3

| | Conditions | Reheating and rough rolling conditions | | | | Primary cooling | Recuperative treatment conditions | |
| --- | --- | --- | --- | --- | --- | --- | --- | --- |
| | | Reheating extraction temperature (° C.) | Thickness of slab (mm) | Thickness after rough rolling (mm) | Rough rolling end temperature (° C.) | conditions Primary cooling end surface temperature (° C.) | Surface temperature for reaching recuperative treatment (° C.) | Remarks |
| IS A | A-1 | 1070 | 244 | 80 | 1000 | 559 | 773 | Recommended conditions |
| | A-2 | 1085 | 244 | 25 | 990 | 549 | 763 | Recommended conditions |
| | A-3 | 1120 | 220 | 50 | 1040 | 551 | 779 | Recommended conditions |
| | A-4 | 1110 | 244 | 65 | 1070 | 629 | 843 | Exceeding recuperative temperature |
| | A-5 | 1130 | 220 | 35 | 950 | 461 | 689 | Less than recuperative temperature |
| | A-6 | 1050 | 220 | 60 | 1020 | 531 | 759 | Recommended conditions |
| IS B | B-1 | 1070 | 244 | 80 | 1000 | 559 | 773 | Recommended conditions |
| | B-2 | 1080 | 244 | 25 | 1000 | 559 | 773 | Recommended conditions |
| | B-3 | 1105 | 220 | 50 | 1040 | 551 | 779 | Recommended conditions |
| | B-4 | 1100 | 244 | 65 | 1080 | 639 | 853 | Exceeding recuperative temperature |
| | B-5 | 1075 | 220 | 35 | 950 | 461 | 689 | Less than recuperative temperature |
| IS C | C-1 | 1090 | 244 | 80 | 1000 | 559 | 773 | Recommended conditions |
| | C-2 | 1060 | 244 | 25 | 990 | 549 | 763 | Recommended conditions |
| | C-3 | 1110 | 244 | 65 | 1085 | 644 | 858 | Exceeding recuperative temperature |
| | C-4 | 1060 | 220 | 35 | 980 | 491 | 719 | Less than recuperative temperature |
| | C-5 | 1070 | 220 | 60 | 1020 | 531 | 759 | Recommended conditions |
| IS D | D-1 | 1080 | 244 | 60 | 1000 | 559 | 773 | Recommended conditions |
| | D-2 | 1070 | 244 | 25 | 990 | 549 | 763 | Recommended conditions |
| | D-3 | 1100 | 244 | 65 | 1040 | 599 | 813 | Exceeding recuperative temperature |
| | D-4 | 1020 | 220 | 35 | 970 | 481 | 709 | Less than recuperative temperature |
| IS E | E-1 | 1085 | 244 | 80 | 1005 | 564 | 778 | Recommended conditions |
| | E-2 | 1075 | 244 | 25 | 990 | 549 | 763 | Recommended conditions |

TABLE 3-continued

| | Conditions | Reheating and rough rolling conditions | | | | Primary cooling conditions Primary cooling end surface temperature (° C.) | Recuperative treatment conditions Surface temperature for reaching recuperative treatment (° C.) | Remarks |
|---|---|---|---|---|---|---|---|---|
| | | Reheating extraction temperature (° C.) | Thickness of slab (mm) | Thickness after rough rolling (mm) | Rough rolling end temperature (° C.) | | | |
| | E-3 | 1110 | 244 | 65 | 990 | 549 | 763 | Recommended conditions |
| CS F | F-1 | 1090 | 244 | 65 | 1000 | 559 | 773 | Recommended conditions |
| CS G | G-1 | 1090 | 244 | 65 | 1000 | 559 | 773 | Recommended conditions |
| CS H | H-1 | 1080 | 244 | 65 | 1005 | 564 | 778 | Recommended conditions |
| CS I | I-1 | 1080 | 244 | 65 | 990 | 549 | 763 | Recommended conditions |

TABLE 4

| | Conditions | Finish rolling conditions Finish rolling end temperature (° C.) | Secondary cooling conditions | | Remarks |
|---|---|---|---|---|---|
| | | | Secondary cooling rate (° C./sec) | Secondary cooling end temperature (° C.) | |
| IS A | A-1 | 860 | 15.0 | 250 | Recommended conditions |
| | A-2 | 850 | 10.0 | 360 | Recommended conditions |
| | A-3 | 888 | 7.0 | 340 | Recommended conditions |
| | A-4 | 930 | 8.0 | 385 | Recommended conditions |
| | A-5 | 800 | 7.0 | 390 | Recommended conditions |
| | A-6 | 870 | 7.0 | 600 | High-temperature of secondary cooling end temperature |
| IS B | B-1 | 860 | 13.0 | 260 | Recommended conditions |
| | B-2 | 860 | 21.0 | 350 | Recommended conditions |
| | B-3 | 890 | 14.0 | 270 | Recommended conditions |
| | B-4 | 935 | 18.0 | 300 | Recommended conditions |
| | B-5 | 830 | 8.0 | 386 | Recommended conditions |
| IS C | C-1 | 858 | 10.0 | 270 | Recommended conditions |
| | C-2 | 840 | 25.0 | 320 | Recommended conditions |
| | C-3 | 930 | 10.0 | 394 | Recommended conditions |
| | C-4 | 825 | 7.0 | 400 | Recommended conditions |
| | C-5 | 870 | 9.0 | 550 | High-temperature of secondary cooling end temperature |
| IS D | D-1 | 855 | 15.0 | 270 | Recommended conditions |
| | D-2 | 850 | 15.0 | 350 | Recommended conditions |
| | D-3 | 800 | 10.0 | 400 | Recommended conditions |
| | D-4 | 820 | 7.0 | 260 | Recommended conditions |

TABLE 4-continued

| | Conditions | Finish rolling conditions — Finish rolling end temperature (° C.) | Secondary cooling conditions — Secondary cooling rate (° C./sec) | Secondary cooling conditions — Secondary cooling end temperature (° C.) | Remarks |
|---|---|---|---|---|---|
| IS E | E-1 | 865 | 15.0 | 260 | Recommended conditions |
| | E-2 | 850 | 19.0 | 400 | Recommended conditions |
| | E-3 | 850 | 3.0 | 480 | Less than secondary cooling rate |
| CS F | F-1 | 860 | 10.0 | 380 | Recommended conditions |
| CS G | G-1 | 850 | 10.0 | 380 | Recommended conditions |
| CS H | H-1 | 865 | 10.0 | 380 | Recommended conditions |
| CS I | I-1 | 850 | 10.0 | 380 | Recommended conditions |

TABLE 5

| | Conditions | YS (Mpa) | TS (Mpa) | High-angle grain boundary fraction | Fatigue crack growth rate ($\times 10^{-5}$ mm/cycle) | Remarks |
|---|---|---|---|---|---|---|
| IS A | A-1 | 723 | 863 | 0.49 | 1.99 | IE 1 |
| | A-2 | 764 | 898 | 0.47 | 2.18 | IE 2 |
| | A-3 | 743 | 881 | 0.49 | 1.90 | IE 3 |
| | A-4 | 735 | 872 | 0.37 | 6.78 | CE 1 |
| | A-5 | 745 | 887 | 0.42 | 5.20 | CE 2 |
| | A-6 | 674 | 792 | 0.47 | 2.26 | CE 3 |
| IS B | B-1 | 712 | 823 | 0.49 | 1.93 | IE 4 |
| | B-2 | 716 | 866 | 0.49 | 1.93 | IE 5 |
| | B-3 | 705 | 847 | 0.50 | 1.85 | IE 6 |
| | B-4 | 710 | 846 | 0.37 | 6.10 | CE 4 |
| | B-5 | 734 | 872 | 0.42 | 4.95 | CE 5 |
| IS C | C-1 | 715 | 883 | 0.49 | 1.91 | IE 7 |
| | C-2 | 740 | 898 | 0.48 | 2.08 | IE 8 |
| | C-3 | 718 | 863 | 0.36 | 5.80 | CE 6 |
| | C-4 | 734 | 896 | 0.43 | 3.58 | CE 7 |
| | C-5 | 640 | 796 | 0.47 | 2.16 | CE 8 |
| IS D | D-1 | 712 | 862 | 0.50 | 1.84 | IE 9 |
| | D-2 | 730 | 871 | 0.48 | 2.03 | IE 10 |
| | D-3 | 705 | 855 | 0.37 | 6.40 | CE 9 |
| | D-4 | 720 | 863 | 0.42 | 4.80 | CE 10 |
| IS E | E-1 | 715 | 847 | 0.50 | 1.84 | IE 11 |
| | E-2 | 717 | 842 | 0.48 | 2.09 | IE 12 |
| | E-3 | 675 | 797 | 0.48 | 2.09 | CE 11 |
| CS F | F-1 | 357 | 453 | 0.46 | 2.44 | CE 12 |
| CS G | G-1 | 352 | 550 | 0.49 | 1.94 | CE 13 |
| CS H | H-1 | 485 | 618 | 0.46 | 2.47 | CE 14 |
| CS I | I-1 | 415 | 551 | 0.46 | 2.38 | CE 15 |

* IE: Inventive example
* CE: Comparative example

Invention steels A to E are steel materials satisfying the content of steel composition of the present disclosure. Among them, it can be confirmed that Inventive Examples 1 to 12 satisfying the process conditions of the present disclosure have a high-angle grain boundary fraction of the surface layer portion of 45% or more, a yield strength of 700 MPa or more, a tensile strength of 800 MPa or more, and a fatigue crack growth rate of $2.5 \times 10^{-5}$ mm/cycle.

In the case of Comparative Examples 1, 4, 6 and 9, which satisfy the content of steel composition of the present disclosure, but the recuperative treatment temperature exceeds the range of the present disclosure, it can be confirmed that a high-angle grain boundary fraction is less than 45% and the fatigue crack growth rate exceeds $2.5 \times 10^{-5}$ mm/cycle. This is because the surface layer portion of the steel material is heated to a temperature higher than a temperature within a range of a two phase heat treatment zone, such that all structures of the surface layer portion is reverse transformed into austenite, and the final structure of the surface layer portion is formed of the structure of lath bainite.

In the case of Comparative Examples 2, 5, 7 and 10, which satisfies the content of steel composition of the present disclosure, but the recuperative treatment temperature is less than the range of the present disclosure, it can be confirmed that all of the high-angle grain boundaries are less than 45%, and the fatigue crack growth rate is $2.5 \times 10^{-5}$ mm/cycle. This is because, during the primary cooling, the surface layer portion of the steel material is excessively cooled, so that the reverse transformation austenitic structure in the surface layer portion is not sufficiently formed.

In the case of Comparative Examples 3 and 8 in which satisfy the content of steel composition of the present disclosure, but in which the end temperature of the secondary cooling exceeds the range of the present disclosure, it can be confirmed that sufficient lath bainite is not formed in the central portion not to sufficiently secure tensile strength and yield strength. In addition, in the case of Comparative Example 11, which satisfies the content of steel composition of the present disclosure, but the cooling rate of the secondary cooling is less than the range of the present disclosure, it can be confirmed that the sufficient lath bainite may not be formed in the central portion and yield strength above a certain level cannot be secured.

In the case of Comparative Examples 12 to 15, it can be confirmed that all of the process conditions of the present disclosure are satisfied, but the contents of C, Mn, Nb, and B for realizing high strength are less than the range of the present disclosure, and thus, tensile strength and yield strength of a certain level or more cannot be secured.

Therefore, in the structural steel material according to an embodiment of the present disclosure and the manufacturing method therefor, a high-strength structural steel material having a tensile strength of 800 MPa or more, while securing the fatigue crack inhibitory characteristics, by optimizing the alloy composition, the microstructure, and the process conditions, and a manufacturing method therefor may be provided.

While example embodiments have been shown and described above, it will be apparent to those skilled in the art that modifications and variations could be made without departing from the scope of the present inventive concept as defined by the appended claims.

The invention claimed is:

1. A structural steel material, comprising, by weight %: 0.02% to 0.12% of C, 1.7% to 2.5% of Mn, 0.01% to 0.8% of Si, 0.005% to 0.5% of Al, and a balance Fe and unavoidable impurities, wherein a microstructure of the structural steel material is divided into a surface layer portion outside and a central portion inside in a thickness direction, the surface layer portion comprises tempered bainite as a matrix structure, fresh martensite as a second structure, and austenite as a residual structure, and the central portion comprises lath bainite.

2. The structural steel material of claim 1, wherein the surface layer portion is divided into an upper surface layer portion on an upper side and a lower surface layer portion on a lower side, and the upper surface layer portion and the lower surface layer portion is provided with a thickness of 3% to 10% of the thickness of the structural steel material, respectively.

3. The structural steel material of claim 1, wherein the matrix structure and the second structure are included in the surface layer portion in a volume fraction of 95% or more.

4. The structural steel material of claim 1, wherein the residual structure is included in the surface layer portion in a volume fraction of 5% or less.

5. The structural steel material of claim 1, wherein an average particle diameter of the tempered bainite is 3 μm or less, excluding 0 μm.

6. The structural steel material of claim 1, wherein an average particle diameter of the fresh martensite is 3 μm or less, excluding 0 μm.

7. The structural steel material of claim 1, wherein the structural steel material further comprises one type or two or more types of, by weight %:

0.005% to 0.1% of Nb, 0.005% to 0.1% of Ti, 0.02% or less of P, 0.004% or less of B, 0.015% or less of N, 0.01% or less of S, 0.01% to 1.0% of Cu, 0.01% to 2.0% of Ni, 0.01% to 1.0% of Mo, 0.05% to 1.0% of Cr, 0.01% to 0.4% of V, and 0.006% or less of Ca.

8. The structural steel material of claim 1, wherein the structural steel material has a yield strength of 690 MPa or more.

9. The structural steel material of claim 1, wherein the structural steel material has a tensile strength of 800 MPa or more.

10. The structural steel material of claim 1, wherein a high-angle grain boundary fraction of the surface layer portion is 45% or more.

11. The structural steel material of claim 1, wherein a fatigue crack growth rate of the structural steel material is $2.5 \times 10^{-5}$ mm/cycle or less.

* * * * *